(12) United States Patent
Hynecek et al.

(10) Patent No.: US 6,522,355 B1
(45) Date of Patent: Feb. 18, 2003

(54) DIGITAL NONUNIFORMITY CORRECTION FOR IMAGE SENSORS

(75) Inventors: Jaroslav Hynecek, Richardson, TX (US); Russell J. Austin, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/056,678

(22) Filed: Apr. 7, 1998

Related U.S. Application Data

(60) Provisional application No. 60/043,883, filed on Apr. 10, 1997.

(51) Int. Cl.⁷ .................................................. H04N 9/64
(52) U.S. Cl. ........................................ 348/245; 348/243
(58) Field of Search ................................. 348/241, 243, 348/245, 246, 247, 244, 251, 252, 255, 249, 294, 222, 207, 207.99; 358/461, 463, 482, 518; 250/208.1; 382/245, 274

(56) References Cited

U.S. PATENT DOCUMENTS

| | | | |
|---|---|---|---|
| 4,484,223 A | * 11/1984 | Tsunekawa | 348/243 |
| 4,602,291 A | * 7/1986 | Temes | 348/243 |
| 4,698,685 A | * 10/1987 | Beaverson | 348/246 |
| 4,739,495 A | * 4/1988 | Levine | 348/247 |
| 4,752,694 A | * 6/1988 | Hegel, Jr. et al. | 250/208.1 |
| 4,805,023 A | 2/1989 | Younse et al. | |
| 5,153,421 A | * 10/1992 | Tandon et al. | 250/208.1 |
| 5,331,420 A | * 7/1994 | Yamano et al. | 348/246 |
| 5,355,164 A | * 10/1994 | Shimoyama et al. | 348/243 |
| 5,376,966 A | * 12/1994 | Takase | 348/243 |
| 5,452,109 A | * 9/1995 | Compton | 358/482 |
| 5,519,441 A | * 5/1996 | Gusmano et al. | 348/207 |
| 5,784,100 A | * 7/1998 | Konishi | 348/251 |
| 5,940,125 A | * 8/1999 | Suganuma | 348/243 |

* cited by examiner

*Primary Examiner*—Aung S. Moe
(74) *Attorney, Agent, or Firm*—Alan K. Stewart; Wade James Brady, III; Frederick J. Telecky, Jr.

(57) ABSTRACT

A method of compensating for nonuniformities in an image sensor includes: providing an image sensing device 20; measuring test pixel signals from the image sensing device 20 during a test mode; determining which test pixel signals are greater than a fixed threshold level $S_T$; and calculating nonuniformity coefficients for the pixels having test pixel signals greater than the fixed threshold level $S_T$.

7 Claims, 2 Drawing Sheets

DIGITAL NONUNIFORMITY CORRECTION FOR IMAGE SENSORS

This application claims priority under 35 USC §119 (e)(1) of provisional application No. 60/043,883, filed Apr. 10, 1997.

FIELD OF THE INVENTION

This invention generally relates to image sensing devices, and more particularly relates to correction circuits for image sensors.

BACKGROUND OF THE INVENTION

Dark current nonuniformities are present in CCD and CMOS active pixel sensors. The dark current nonuniformities result from material impurities which are not uniformly distributed in the substrate. Some prior art solutions to the nonuniformities include substituting neighboring pixels and smoothing the amplitude by analog signal processing methods. Analog signal processing results in art effects and incorrect pixel correction.

SUMMARY OF THE INVENTION

Generally, and in one form of the invention, the method of compensating for nonuniformities in an image sensor includes: providing an image sensing device; measuring test pixel signals from the image sensing device during a test mode; determining which test pixel signals are greater than a fixed threshold level; and calculating nonuniformity coefficients for the pixels having test pixel signals greater than the fixed threshold level. The processing for correcting pixel nonuniformities is in the digital domain.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
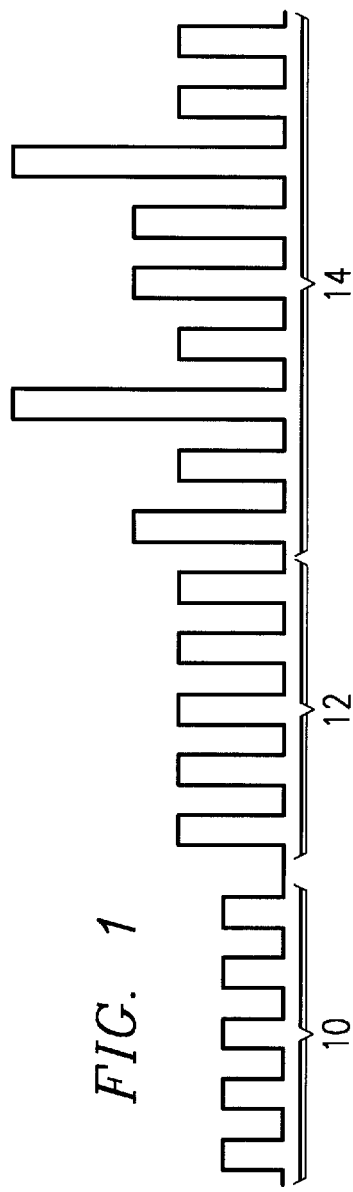
FIG. 1 is an output signal from an image sensor.

The typical output of an image sensor can be modified as shown in FIG. 1. The output shown in FIG. 1 includes dummy pixel signal 10, dark pixel signal 12, and image pixel signal 14. The output shown in FIG. 1 is easily achieved by starting to clock the CCD serial register prior to the parallel transfer. This will shift several dummy (empty) pixels to the output. After the dummy pixels are read out, the serial register can be stopped, signal transferred into it from the memory or the image sensing area and then restarted again. The dummy pixel signal level is used to eliminate the signal processing system problems such as DC offset and DC temperature and power supply drifts. The dummy pixel signal level is subtracted from the rest of the signal to leave only the absolute dark signal and image area signal. The dark signal is obtained from the dark reference pixels which are formed by covering a part of the image area pixels by a light shield.

Since the dark reference signal is also sensitive to temperature and the integration time, it can be used as a normalization factor for the pixel nonuniformity compensation. The nonuniformity signal is additive in its nature, which means that it adds to the photo signal linearly and, therefore, can be subtracted. The nonuniformity amplitude is typically proportional to integration time and also to temperature. The correction circuit needs to incorporate these variables to make the correction independent of both the temperature and integration time. It is advantageous to form an average from several dark reference pixels to minimize the random temporal noise present in each pixel.

To correct the nonuniformities, a fixed threshold is determined and only the nonuniformities which exceed that threshold are corrected. Once the nonuniformity is detected, the amplitude of the nonuniformity is divided by the average dark reference signal and the resulting nonuniformity coefficient is stored in memory together with the corresponding pixel address. This process is performed during the device testing where the integration time is adjusted so that only a small number (moderate number) of nonuniformities are detected, to minimize the memory size.

Figure 2:
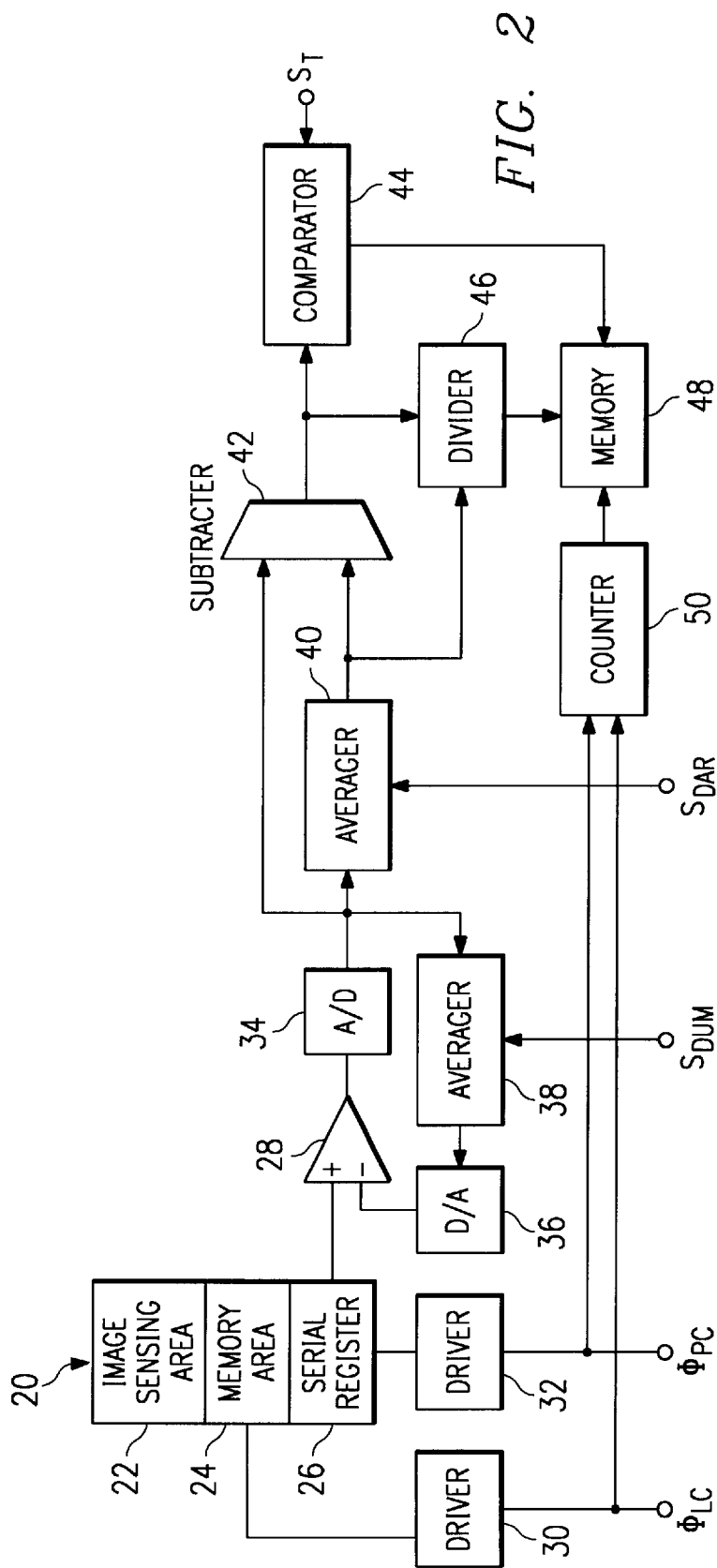
FIG. 2 is a block diagram describing the calibrating mode for digital nonuniformity correction of an image sensor.

A block diagram describing the calibrating mode (test mode) during the device testing is shown in FIG. 2. The device of FIG. 2 includes image sensing device 20 which includes image sensing area 22, memory area 24, and serial register 26; differential amplifier 28; image sensing device driver 30; serial register driver 32; analog to digital A/D converter 34; digital to analog D/A converter 36; dummy pixel averager 38; dark pixel averager 40; digital subtracter 42; digital comparator 44; digital divider 46; memory 48; pixel and line counter 50; line clock $\phi_{LC}$; pixel clock $\phi_{PC}$; reset and dummy pixel select signal $S_{DUM}$; reset and dark pixel select signal $S_{DAR}$; and fixed threshold number $S_T$. The image sensing device can be a charge coupled device (CCD) sensor or a CMOS image sensor.

Referring to the block diagram of FIG. 2, the dummy pixel data is transferred from serial register 26 through positive input of amplifier 28 and converted to digital by A/D converter 34. The dummy pixel data is then averaged by averager 38 and converted to an analog signal by D/A converter 36. The average of the dummy pixel data is then input into the negative input of amplifier 28 where it is subtracted from the dark pixel data and the image pixel data. Then a row of image pixel data and dark pixel data is transferred into serial register 26. The image and dark pixel data is transferred from serial register 26 to amplifier 28, where the average dummy pixel data is subtracted. The data is then converted to digital by A/D converter 34. The dark pixel data is transferred to averager 40 and the average of the dark pixel data is provided to an input of subtracter 42 to be subtracted from the image pixel data. The output of subtracter 42 is the image pixel data minus the average dummy pixel data and minus the average dark pixel data. The image pixel data from the subtracter 42 is then compared to the fixed threshold level by comparator 44. The image pixel data from the subtracter is also divided by the average dark pixel data by divider 46. For each pixel that has a signal greater than the fixed threshold level, the nonuniformity coefficient from divider 46 is stored in memory 48 along with the pixel address from pixel and line counter 50. The above process is repeated for all of the rows of pixels from the image area 22.

During the device operation (readout mode) the signal from the dark reference area is extracted and used to multiply the nonuniformity coefficient which is retrieved from the memory for the corrected pixel depending on the pixel address. The result is then subtracted from the image pixel signal. The memory is typically nonvolatile such as EPROM, EEPROM, or other internal fuse based PROM devices. If a dynamic memory is used, the sensor needs to be calibrated prior to each use.

Figure 3:
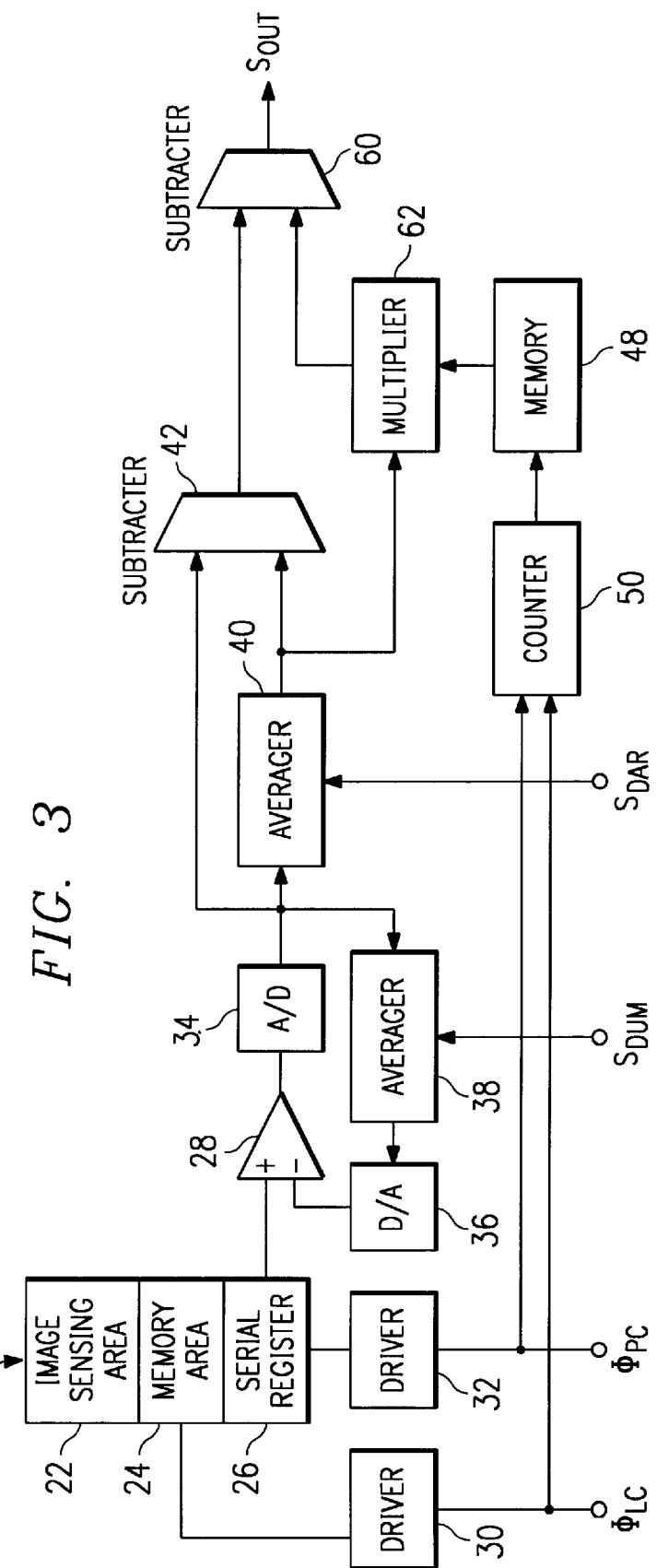
FIG. 3 is a block diagram describing the read out mode for digital nonuniformity correction of an image sensor.

A block diagram describing the device during readout mode is shown in FIG. 3. The device of FIG. 3 includes image sensing device 20 which includes image sensing area 22, memory area 24, and serial register 26; differential amplifier 28; image sensing device driver 30; serial register driver 32; analog to digital A/D converter 34; digital to analog D/A converter 36; dummy pixel averager 38; dark pixel averager 40; digital subtracters 42 and 60; digital multiplier 62; memory 48; pixel and line counter 50; line clock $\phi_{LC}$; pixel clock $\phi_{PC}$; reset and dummy pixel select signal $S_{DUM}$; reset and dark pixel select signal $S_{DAR}$; and output signal $S_{OUT}$.

Referring to the block diagram of FIG. 3, during readout mode, the device operates similar to the calibrating mode except that the coefficients stored in memory 48 are multiplied by the average dark pixel data by multiplier 62 and subtracted from the corresponding image pixel data by subtracter 60. The output of subtracter 60 is then the corrected image pixel data $S_{OUT}$.

One advantage of this invention is that the amount of correction for a pixel is based on the dark current measurement from that pixel. Another advantage is that the correction is accomplished entirely in the digital domain without analog signal processing art effects.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of compensating for nonuniformities in an image sensor comprising:

providing an image sensing device;

measuring test pixel signals from the image sensing device during a test mode;

scaling the test pixel signals by subtracting a dummy pixel signal level and a dark pixel signal level from the test pixel signals;

comparing the scaled pixel signals with a fixed threshold level; and calculating nonuniformity coefficients for pixels having said scaled pixel signals greater than the fixed threshold level.

2. The method of claim 1 wherein the step of calculating nonuniformity coefficients comprises dividing the scaled pixel signals by the dark pixel signal level.

3. The method of claim 1 wherein the dummy pixel signal level is an average signal from more than one dummy pixel signal.

4. The method of claim 1 wherein the dark pixel signal level is an average signal from more than one dark pixel signal.

5. The method of claim 1 further comprising:

measuring image data pixel signals from the image sensing device during a read out mode; and multiplying the image data pixel signals by the corresponding nonuniformity coefficients for the pixels having test pixel signals greater than the fixed threshold level.

6. The method of claim 5 wherein the image data pixel signals are digital signals.

7. The method of claim 1 wherein the test pixel signals are digital signals.

* * * * *